US009176347B2

(12) United States Patent  (10) Patent No.: US 9,176,347 B2
Peng et al.  (45) Date of Patent: Nov. 3, 2015

(54) LATERAL ELECTRIC FIELD TYPE LIQUID CRYSTAL DISPLAY DEVICE HAVING NON-UNIFORM SPACINGS BETWEEN TWO ELECTRODES

(71) Applicant: VastView Technology Inc., Hsinchu County (TW)

(72) Inventors: Cheng-Chung Peng, Hsinchu (TW); Yuh-Ren Shen, Tainan (TW); Hsin-Ta Lee, Taichung (TW)

(73) Assignee: VastView Technology Inc., Hsinchu County (TW)

( * ) Notice: Subject to any disclaimer, the term of this patent is extended or adjusted under 35 U.S.C. 154(b) by 189 days.

(21) Appl. No.: 13/708,363

(22) Filed: Dec. 7, 2012

(65) Prior Publication Data

US 2014/0160412 A1  Jun. 12, 2014

(51) Int. Cl.
*G02F 1/1343* (2006.01)

(52) U.S. Cl.
CPC .... *G02F 1/134309* (2013.01); *G02F 1/134363* (2013.01)

(58) Field of Classification Search
CPC ............... G02F 1/134309; G02F 1/134363; G02F 2001/133322; G02F 2001/133317; G02F 2001/133314

USPC .................................................. 349/141, 146
See application file for complete search history.

(56) References Cited

U.S. PATENT DOCUMENTS

| | | | |
|---|---|---|---|
| 7,362,400 B2 * | 4/2008 | Itou et al. | 349/141 |
| 2005/0099570 A1 * | 5/2005 | Matsumoto et al. | 349/141 |
| 2007/0222927 A1 * | 9/2007 | Uehara et al. | 349/117 |
| 2010/0182522 A1 * | 7/2010 | Woo et al. | 349/37 |

* cited by examiner

*Primary Examiner* — Nathanael R Briggs
(74) *Attorney, Agent, or Firm* — Lin & Associates IP, Inc.

(57) ABSTRACT

A lateral electric field type liquid crystal display (LCD) device comprises a first substrate formed with a plurality of first electrodes and at least one second electrode, a second substrate and a liquid crystal layer disposed between the two substrates. Each first electrode comprises an array of electrode segments and every adjacent first and second electrodes have a minimum spacing smaller than a maximum spacing in between. Each second electrode is a strip electrode or also comprises an array of electrode segments. Each electrode segment is a V-shape electrode rotated with an angle or an electrode segment having at least an extruded portion and at least an intruded portion. The array of electrode segments may be a sinusoidal electrode. The first and second electrodes are oriented in parallel with or at a specific angle with respect to the data line of the lateral electric field type LCD device.

20 Claims, 11 Drawing Sheets

LATERAL ELECTRIC FIELD TYPE LIQUID CRYSTAL DISPLAY DEVICE HAVING NON-UNIFORM SPACINGS BETWEEN TWO ELECTRODES

BACKGROUND OF THE INVENTION

1. Field of the Invention

The present invention relates to a liquid crystal display (LCD) device, and more particularly to the electrode structure of a lateral electric field type LCD device.

2. Description of Related Arts

An LCD device controls the light transmittance by using the characteristic that liquid crystal (LC) molecules present different light polarization or refraction effects under different alignments so as to produce images. A twisted nematic (TN) LCD device has good light transmittance but an extremely narrow viewing angle as influenced by the structure and optical characteristic of the LC molecules.

To solve the transmittance and viewing angle problems, a twisted vertical alignment (TVA) model has been proposed so as to provide the high transmittance and the wide viewing angle. However, because the LC molecules are aligned in a vertical alignment manner, when the LC molecules are applied with a low voltage and the LCD device is watched at an inclined viewing angle, a gray-level inversion problem occurs, which causes the problem of color shift at an inclined viewing angle and influences a normal presentation of images of the LCD device.

Another approach to solving the problems is to use in-plane switching (IPS) technology in which inter-digital electrodes are formed on only one substrate to produce an electric field essentially parallel to the substrate. An IPS LCD device has the advantages of better image quality, improved viewing angle, and more brightness as compared to the TN LCD device.

In a conventional IPS LCD device, the two electrodes formed on one substrate are usually disposed in parallel with each other. The critical voltage required to drive the IPS LCD device is higher and the contrast is also worse. There is a strong need in developing new electrode structure to lower the critical voltage and improve the contrast of the LCD device.

SUMMARY OF THE INVENTION

The present invention has been made to provide a lateral electric field type LCD device with high contrast and wide-viewing-angle characteristics. Accordingly, the lateral electric field type LCD device comprises a first substrate, a second substrate, an LC layer, a first alignment layer, and a second alignment layer. A plurality of first electrodes and at least one second electrode interleaved with the first plurality of first electrodes are formed on the first substrate respectively serving as the pixel and common electrodes of the LCD device.

In accordance with the present invention, the plurality of first electrodes and the second electrodes may be formed on the same layer or two different layers above the first substrate. The spacing between every two adjacent first and second electrodes is made to be non-uniform and therefore there are a minimum spacing and a maximum spacing between the adjacent electrodes. Preferably, the maximum spacing is three times greater than the minimum spacing.

To make the spacing between two adjacent first and second electrodes non-uniform, the present invention provides several different structures for the two electrodes. In one exemplary structure, each of the first electrodes comprises an array of V-shaped electrode segments arrayed in the same vertical direction as the data line of the LCD device, and each of the second electrodes comprises a strip electrode running in the same direction. The openings of the V-shaped electrode are oriented perpendicular to the data line.

In another exemplary structure, each of the first electrodes comprises an array of V-shaped electrode segments with the openings of the V-shaped electrode segments in two adjacent first electrodes being oriented face to face so that every two adjacent first electrodes form a mirrored pair. In a further exemplary structure, each of the second electrodes also comprises an array of V-shaped electrode segments arranged in such a way that every two adjacent first and second electrodes form a mirrored pair.

According to other examples of the present invention, the array of V-shaped electrode segments of the first or second electrode described in the above exemplary structures is replaced by a sinusoidal electrode. In addition, the first and second electrodes may be oriented at a 45° angle with respect to the direction of the data line of the LCD device instead of being in parallel with.

In another exemplary structure of the present invention, each of the first electrodes comprises an array of electrode segments each having extruded portions and intruded portions. Each of the second electrodes is either a strip electrode or an array of electrode segments similar to the first electrode. The first and second electrodes may be oriented in the same direction as the data line of the LCD device or at a 45° angle with respect to the direction of the data line.

In further exemplary structures of the present invention, the data line of the LCD device bends in the middle to form a V-shape with the opening of the V being oriented towards the left. The first and second electrodes, each being an array of V-shaped electrode segments, an array of electrode segments with extrusions and intrusions, a strip electrode or a sinusoidal electrode, also bend in the middle to follow the direction of the data line.

According to the present invention, the two adjacent electrodes that form a mirrored pair may also be positioned with an offset in such a way that they no longer form a mirrored pair. In addition, the first and second electrodes may be oriented substantially in perpendicular to the data line of the LCD device, or at other angles such as 15°~30° with respect to the direction of the data line.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawing illustrates embodiments of the invention and, together with the description, serves to explain the principles of the invention.

Figure 1:
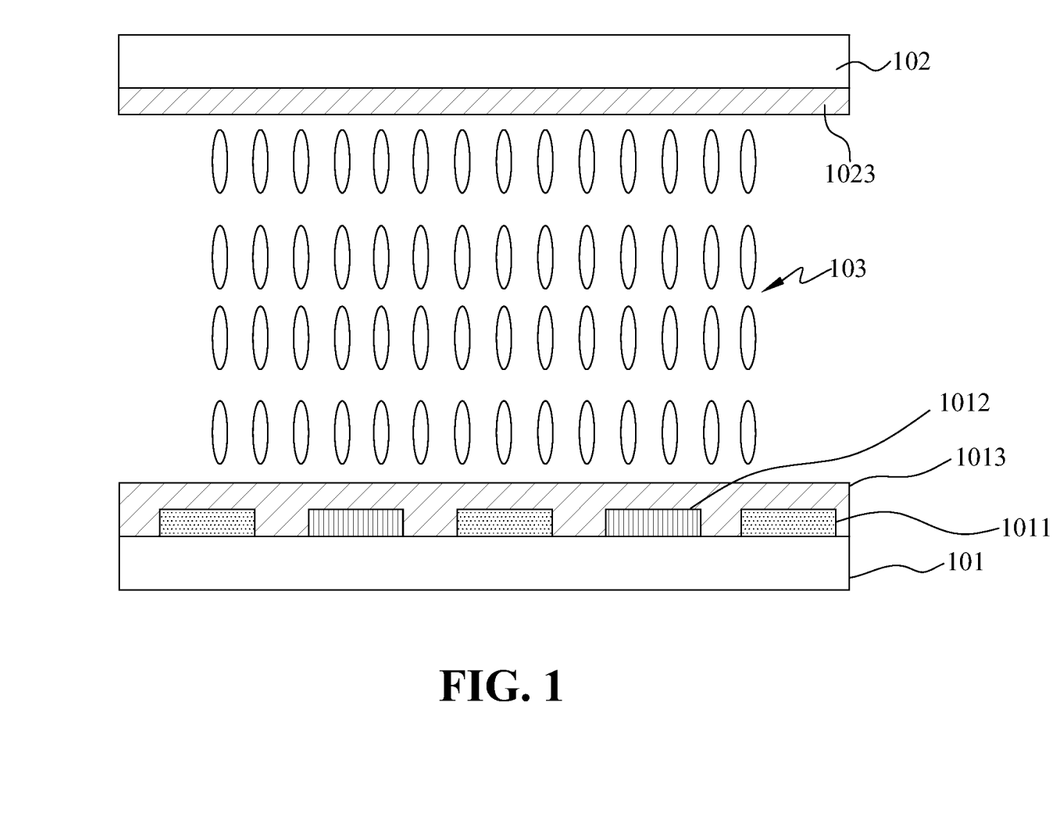
FIG. 1 shows the cross sectional view of the structure of the lateral electric field type LCD device according to the present invention.

With reference to FIG. 1, the lateral electric field type LCD device of the present invention comprises a first substrate 101, a second substrate 102 and an LC layer 103 sandwiched between the first and second substrates. The first substrate 101 is formed with a plurality of first electrodes 1011 and at least one second electrode 1012 as the pixel electrode and the common electrode respectively of the LCD device.

A first alignment layer 1013 is disposed between the first substrate 101 and the LC layer 103, and a second alignment layer 1023 is disposed between the second substrate 102 and the LC layer 103. Although not shown in FIG. 1, generally the color filter and black matrix of the LCD device are also formed on the second substrate.

According to the present invention, each of the first and second alignment layers may be a homeotropic (vertical) alignment layer or a parallel homogeneous alignment layer. The LC layer 103 comprises nematic liquid crystal molecules of positive dielectric anisotropy ($\Delta\epsilon=\epsilon_{//}-\epsilon_{\perp}>0$) or a liquid crystal mixture of positive dielectric anisotropic nematic liquid crystal molecules and a Chiral dopant. If alignment layers with parallel homogeneous alignment are used in the LCD device, the LC layer 103 may also comprise nematic liquid crystal molecules of negative dielectric anisotropy or a liquid crystal mixture of negative dielectric anisotropic nematic liquid crystal molecules and a Chiral dopant.

In the present invention, the plurality of first electrodes 1011 interleaves with the second electrodes 1012. Both first and second electrodes may be formed on the same layer above the first substrate 101 as shown in FIG. 1. Each of the first electrodes 1011 comprises an electrode formed with V-shaped, curved or other patterns with extruded and intruded portions.

Each of the second electrodes 1012 comprises an electrode which may be a strip electrode or may also be an electrode formed with V-shaped, curved or other patterns with extruded and intruded portions. According to the present invention, the spacing between the first and second electrodes is not uniform. In other words, the minimum spacing W1 between two adjacent first electrode and second electrodes should be smaller than the maximum spacing W2 between the two adjacent first electrode and second electrodes. Preferably, W2 is greater than three times of W1.

Figure 2:
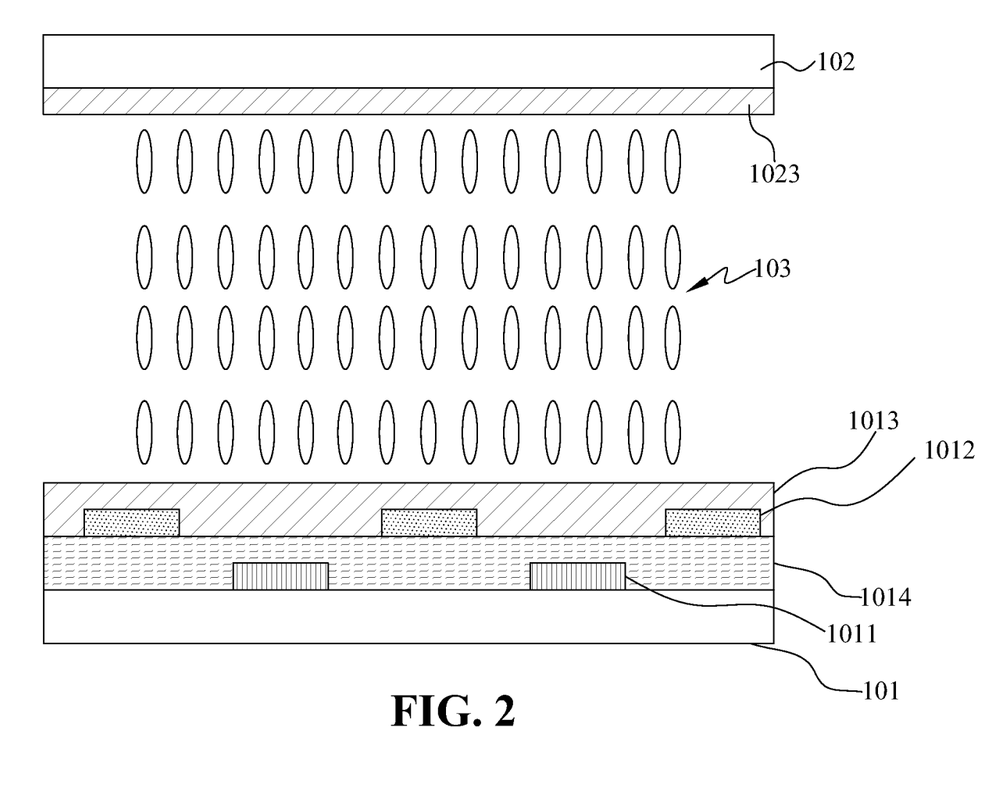
FIG. 2 shows the cross sectional view of another structure of the lateral electric field type LCD device according to the present invention in which the first and second electrodes are formed on two different layers above the first substrate.

As shown in FIG. 2, the plurality of first electrodes 1011 and the second electrodes 1012 may be formed on two different layers above the first substrate 101. After the first electrodes 1011 are formed on the first substrate 101, an insulation layer 1014 is formed to cover the first electrodes 1011 and then the second electrodes 1012 are formed above the insulation layer 1014. If the first and second electrodes are formed on the same layer, the minimum spacing W1 is preferably between 1 μm to 4 μm. If they are formed on two different layers, the minimum spacing W1 can be smaller, preferably between 0 μm to 3 μm.

Figure 3:
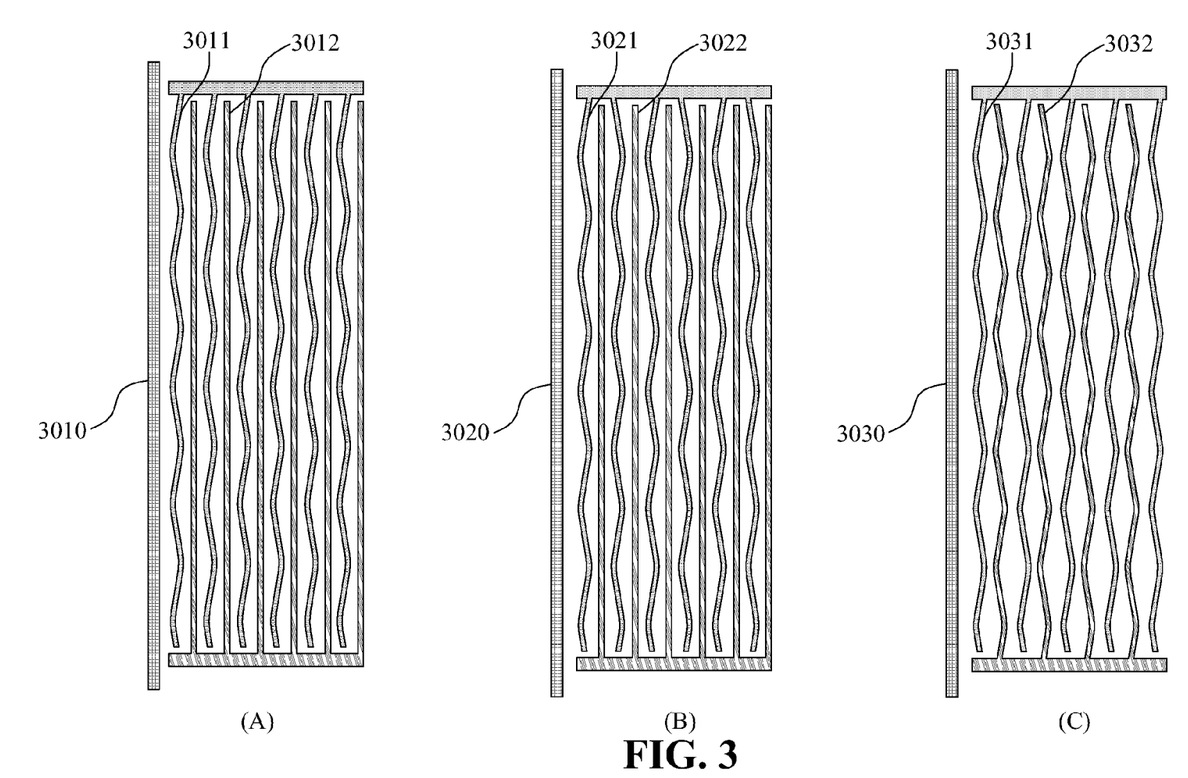
FIGS. 3A-3C show three examples of the first and second electrodes, oriented substantially in parallel with the data line of the LCD device, formed above the first substrate according to the present invention.

FIGS. 3A-3C show the top view of three examples of the first and second electrodes formed in accordance with the present invention. As shown in FIG. 3A, each of the first electrodes 3011 comprises a vertical array of V-shaped electrode segments with the opening of each V-shaped electrode segment oriented horizontally. The angle of the opening in each V-shaped electrode segment is from 90° to 170°, and preferably between 140° to 160°. Each of the second electrodes 3012 comprises a strip electrode running in the direction as the data line 3010 of the LCD device.

As shown in FIG. 3A, all the first electrodes 3011 are running in parallel in the vertical direction. In other words, each vertical array of V-shaped electrode segments is in parallel with another one. In the example shown in FIG. 3B, the first electrodes 3021 are disposed in a different way. Every two adjacent first electrodes 3021 form a mirrored pair with respect to the second electrode 3022 between them. Each of the second electrodes 3022 in FIG. 3B also comprises a strip electrode running in the direction as the data line 3020 of the LCD device.

The first electrodes 3031 shown in the example of FIG. 3C have the same structure as that shown in FIG. 3A. The second electrodes 3032 in this example are not strip electrodes. Similar to the first electrodes 3031, each of the second electrodes 3032 also comprises a vertical array of V-shaped electrode segments. The first and second electrodes 3031, 3032 are arranged in such a way that every two adjacent first and second electrodes form a mirrored pair with respect to a line in parallel with the date line 3030 of the LCD device.

Figure 4:
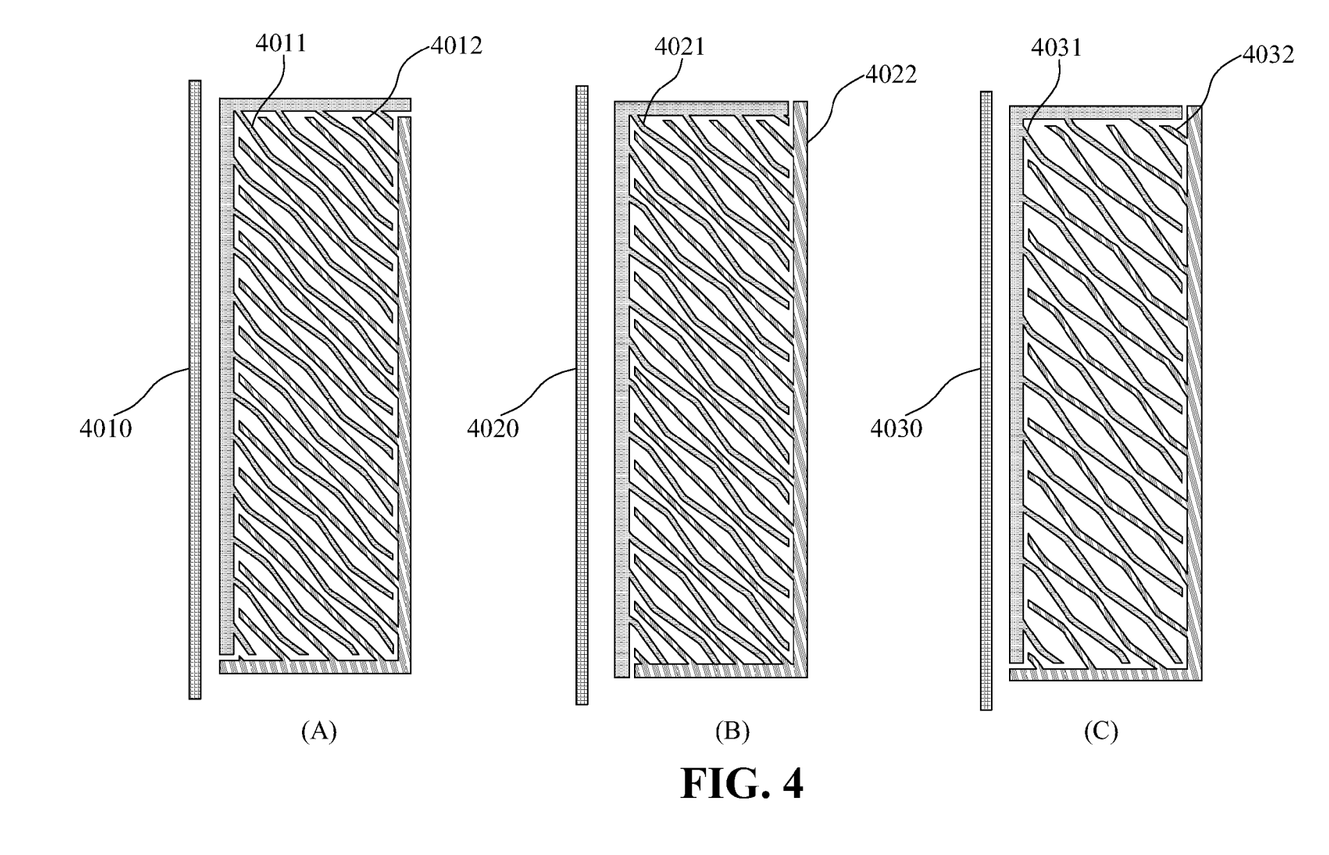
FIGS. 4A-4C show another three examples of the first and second electrodes, oriented at a 45° angle with respect to the direction of the data line of the LCD device, formed above the first substrate according to the present invention.

FIGS. 4A-4C show the top view of another three examples of the first and second electrodes formed in accordance with the present invention. As shown in FIG. 4A, each of the first electrodes 4011 comprises an array of V-shaped electrode segments similar to each of the first electrodes 3011 of FIG. 3A but oriented at 45° angle with respect to the direction of the data line 4010 of the LCD device. Each of the second electrodes 4012 is a strip electrode oriented at 45° angle with respect to the direction of the data line 4010 of the LCD device.

In a same way, the electrode structures of FIGS. 4B and 4C are similar to those of FIGS. 3B and 3C but oriented at 45° angle with respect to the direction of the data line 4020 of the LCD device. In FIG. 4B, each of the second electrodes 4022 is a strip electrode oriented at 45° angle with respect to the direction of the data line 4020 of the LCD device and every two adjacent first electrodes 4021 form a mirrored pair with respect to a line oriented at 45° angle with respect to the direction of the data line 4020.

In FIG. 4C, each of the second electrodes 4032 also comprises an array of V-shaped electrode segments but oriented at 45° angle with respect to the direction of the data line 4030 of the LCD device. In this example, every two adjacent first electrode 4031 and second electrode 4032 form a mirrored pair with respect to a line oriented at 45° angle with respect to the direction of the data line 4030.

Figure 5:
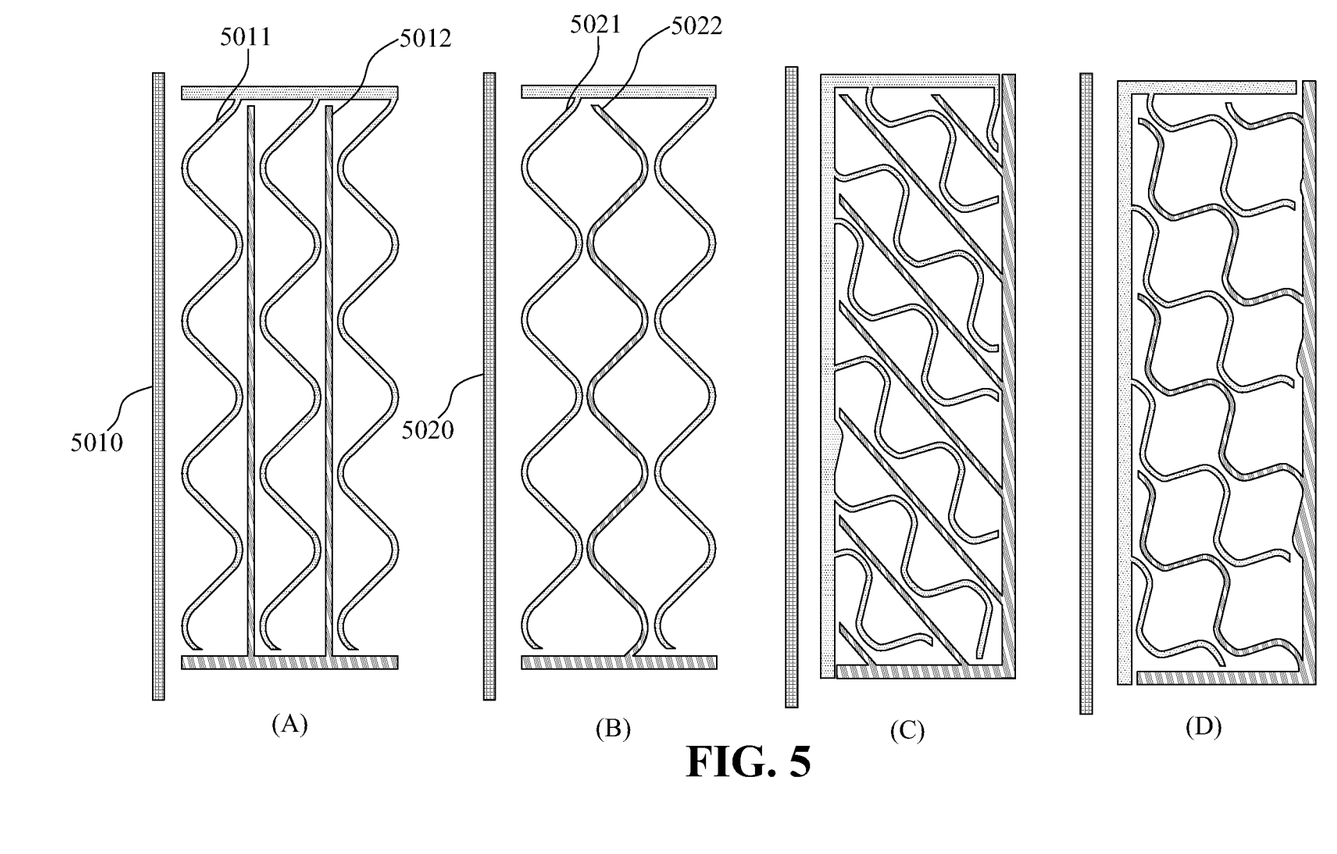
FIGS. 5A-5D show another four examples of the first or second electrodes having sinusoidal electrodes formed above the first substrate according to the present invention.

FIGS. 5A-5D show the top view of another four examples of the first and second electrodes formed in accordance with the present invention. As shown in FIG. 5A, each of the first electrodes 5011 comprises a sinusoidal electrode oriented in the same direction as the data line 5010 of the LCD device. Each of the second electrodes 5012 comprises a strip electrode running in the direction as the data line 5010 of the LCD device.

In the example of FIG. 5B, each of the first electrodes 5021 comprises a sinusoidal electrode oriented in the same direction as the data line 5020 of the LCD device. Each of the second electrodes 5022 is also a sinusoidal electrode oriented in the same direction. As can be seen in FIG. 5B, two adjacent first and second electrodes for a mirrored pair with respect to a line in parallel with the data line 5020. The electrode structures of FIGS. 5C and 5D are similar to FIGS. 5A and 5B except that the first and second electrodes are oriented at 45° angle with respect to the direction of the data line of the LCD device.

Figure 6:
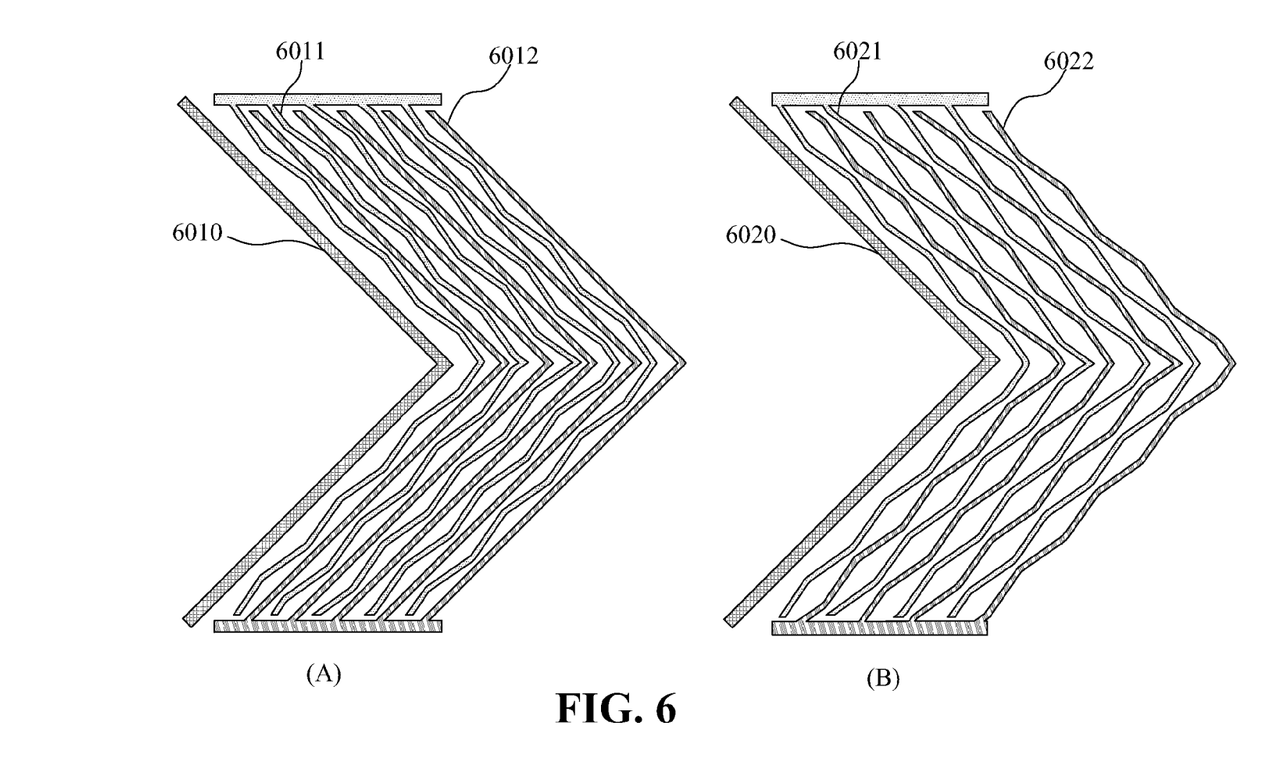
FIGS. 6A-6B show another two examples of the first and second electrodes formed above the first substrate with a bent data line according to the present invention.

FIGS. 6A and 6B show another two examples of the first and second electrodes formed in accordance with the present invention. As can be seen in FIG. 6A, data line 6010 of the LCD device bends in the middle. In other words, data line 6010 is V-shaped with the opening of V oriented to the left. Each of the first electrodes 6011 comprises an array of V-shaped electrode segments similar to the first electrode 3011 of FIG. 3A. The first electrode 6011 is also bent in the middle to follow the running direction of the data line 6010. Similarly, each of the second electrodes 6012 comprises a strip electrode bent in the middle so as to follow the running direction of the data line 6010 of the LCD device.

As shown in FIG. 6B, the data line 6020 in this example also bends in the middle. The first electrodes 6021 and the second electrodes 6022 have structures similar to those of FIG. 3C. However, instead of running vertically, the first electrodes 6021 and second electrodes 6022 are bent in the middle to follow the running direction of the data line 6020 of the LCD device.

Figure 7:
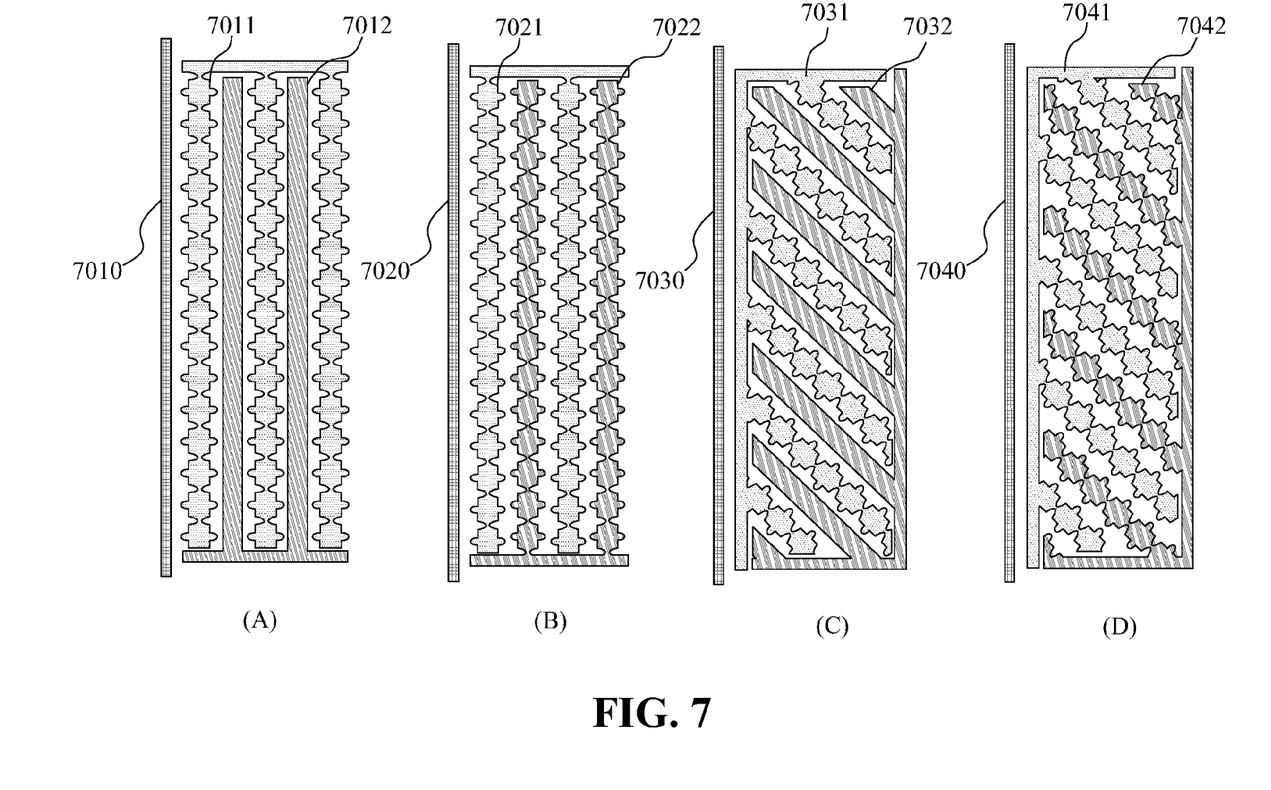
FIGS. 7A-7D show another four examples of the first and second electrodes formed above the first substrate with electrode segments having extruded and intruded portions according to the present invention.

FIGS. 7A-7D show the top view of another four examples of the first and second electrodes formed in accordance with the present invention. As shown in FIG. 7A, each of the first electrodes 7011 comprises an array of electrode segments each having extruded portions and intruded portions. Each of the second electrodes 7012 is a strip electrode. The data line 7010 of the LCD device runs in the vertical direction. Both the first electrodes and the second electrodes are oriented in the same direction as the data line 7010 of the LCD device.

The structure of the first electrodes 7021 shown in FIG. 7B is identical to that of FIG. 7A. In the example of FIG. 7B, however, each of the second electrodes 7022 also comprises an array of electrode segments each having extruded portions and intruded portions. Every two adjacent first and second electrodes form a mirrored pair with respect to a line in parallel with the data line 7020 as can be seen from FIG. 7B. Both the first and second electrodes are oriented in the same vertical direction as the data line 7020.

The structure of the first and second electrodes 7031, 7032 shown in FIG. 7C is similar to that of FIG. 7A. However, both the first and second electrodes 7031, 7032 are oriented at 45° angle with respect to the direction of the data line 7030 of the LCD device. Similarly, the structure of the first and second electrodes 7041, 7042 shown in FIG. 7D is similar to that of FIG. 7B but both the first and second electrodes 7041, 7042 are oriented at 45° angle with respect to the direction of the data line 7040 of the LCD device.

Figure 8:
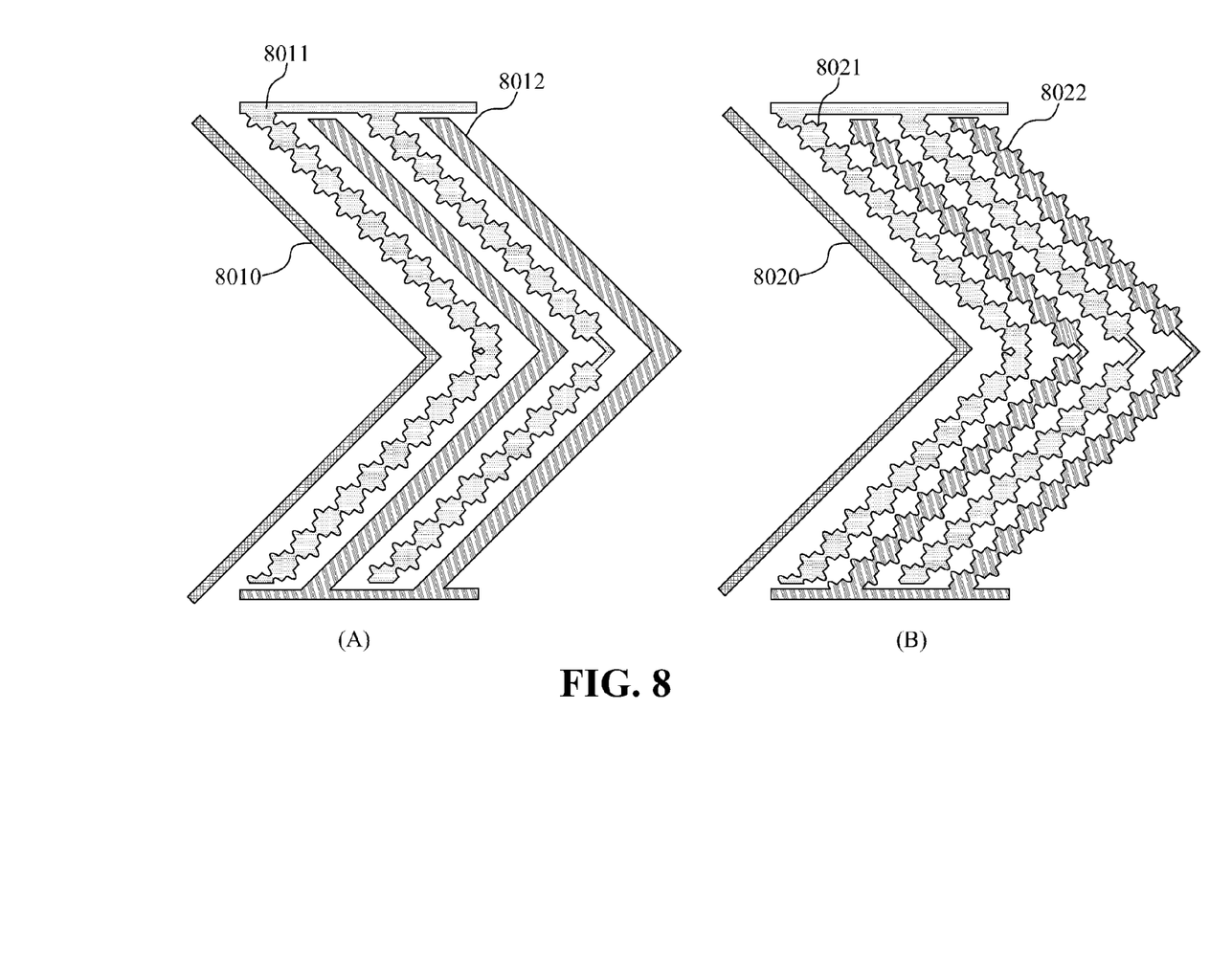
FIGS. 8A-8B show another two examples of the first and second electrodes formed above the first substrate with a bent data line according to the present invention.

FIGS. 8A and 8B show another two examples of the first and second electrodes formed in accordance with the present invention. As can be seen in FIG. 8A, data line 8010 of the LCD device bends in the middle. In other words, data line 8010 is V-shaped with the opening of V oriented to the left. Each of the first electrodes 8011 comprises an array of electrode segments similar to the first electrode 7011 of FIG. 7A. The first electrodes 8011 are bent to follow the running direction of the data line 8010. Similarly, each of the second electrodes 8012 comprises a strip electrode bent in the middle so as to follow the running direction of the data line 8010 of the LCD device.

As shown in FIG. 8B, the data line 8020 in this example also bends in the middle. The first electrodes 8021 and the second electrodes 8022 have structures similar to those of FIG. 7B. However, instead of running vertically, the first electrodes 8021 and second electrodes 8022 are bent to follow the running direction of the data line 8020 of the LCD device.

Figure 9:
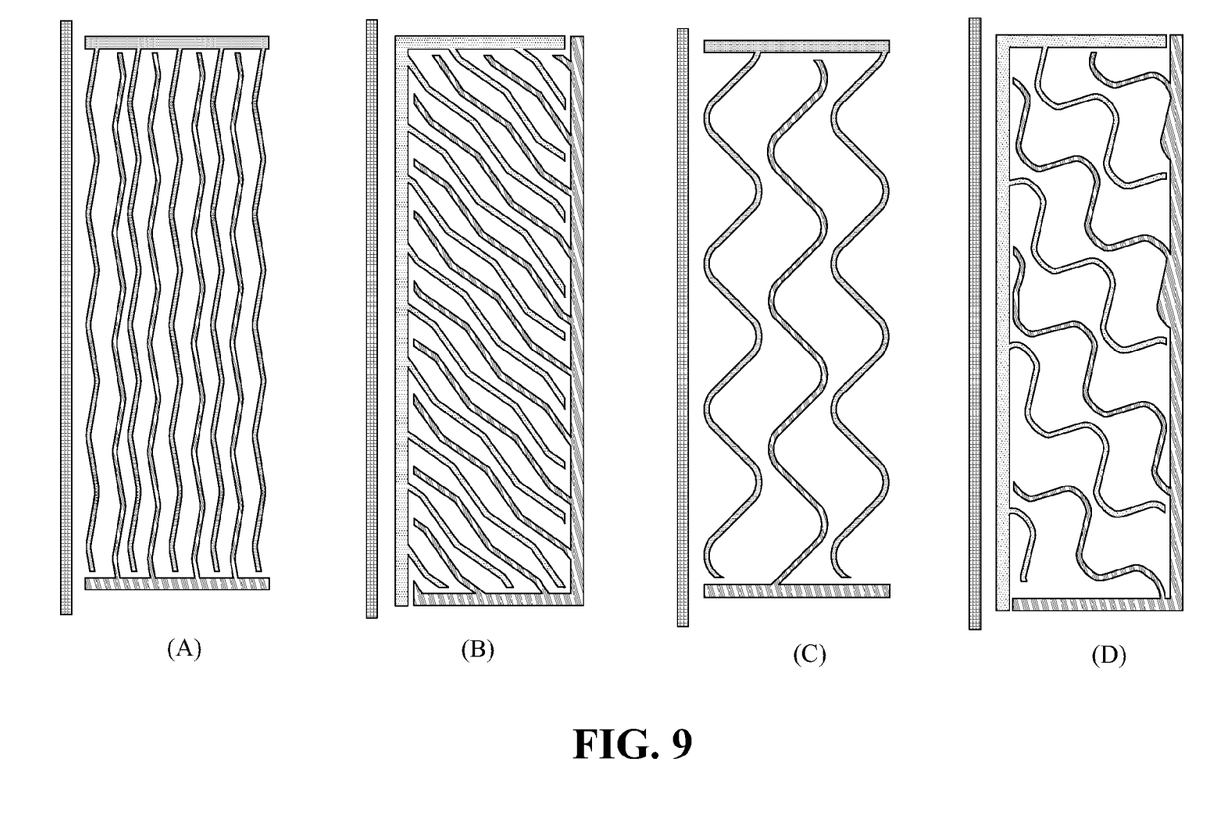
FIGS. 9A-9D show another four examples of the first and second electrodes formed above the first substrate with every two adjacent electrodes not forming a mirrored pair according to the present invention.

FIGS. 9A-9D show the top view of another four examples of the first and second electrodes formed in accordance with the present invention. The structure of first and second electrodes shown in FIG. 9A is similar to that of FIG. 3C except that the first electrodes and the second electrodes are positioned in such a way that every two adjacent first and second electrodes do not form a mirrored pair with respect to a line in parallel with the data line. In this case, both first and second electrodes are running in a vertical direction, and the second electrode has a positional shift relative to the first electrode in the vertical direction.

Similarly, the structures of the first and second electrodes shown in FIGS. 9B, 9C and 9D are similar to those of FIGS. 4C, 5B and 5D respectively except that the first electrodes and the second electrodes in each example are positioned in such a way that every two adjacent first and second electrodes do not form a mirrored pair with respect to a line in parallel with or at a 45° angle with respect to the direction of the data line.

In FIGS. 9B and 9D, both first and second electrodes are running at a 45° angle with respect to the vertical direction and the second electrode has a positional shift relative to the first electrode in the running direction. In FIG. 9C, both first and second electrodes are running in a vertical direction, and the second electrode has a positional shift relative to the first electrode in the vertical direction.

Figure 10:
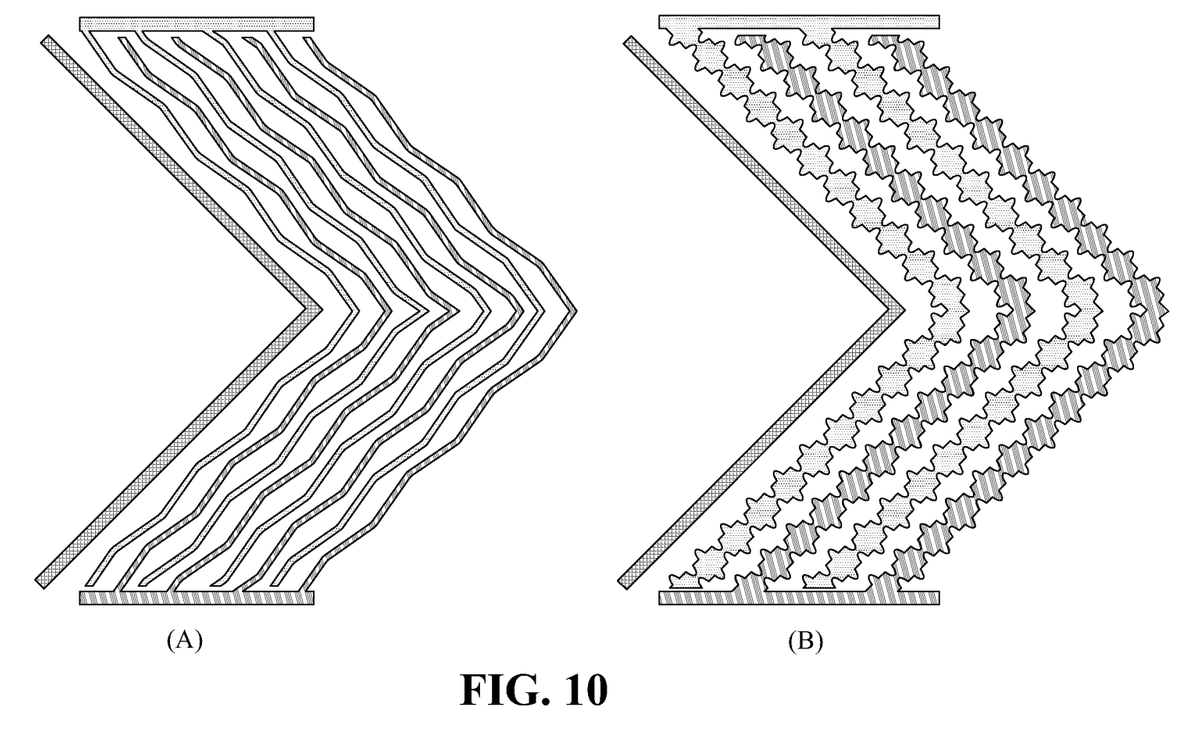
FIGS. 10A-10B show another two examples of the first and second electrodes formed above the first substrate with a bent data line according to the present invention.

FIGS. 10A and 10B show the top view of another two examples of the first and second electrodes formed in accordance with the present invention. The structures of first and second electrodes shown in FIGS. 10A and 10B are similar to those of FIGS. 6B and 8B respectively except that the first electrodes and the second electrodes in each example are positioned in such a way that every two adjacent first and second electrodes do not form a mirrored pair with respect to a line running in the direction of the data line. It should be noted that the data line and both first and second electrodes are running in a V-shape direction with the opening of V oriented to the left and the second electrode has a positional shift relative to the first electrode in the running direction.

Figure 11:
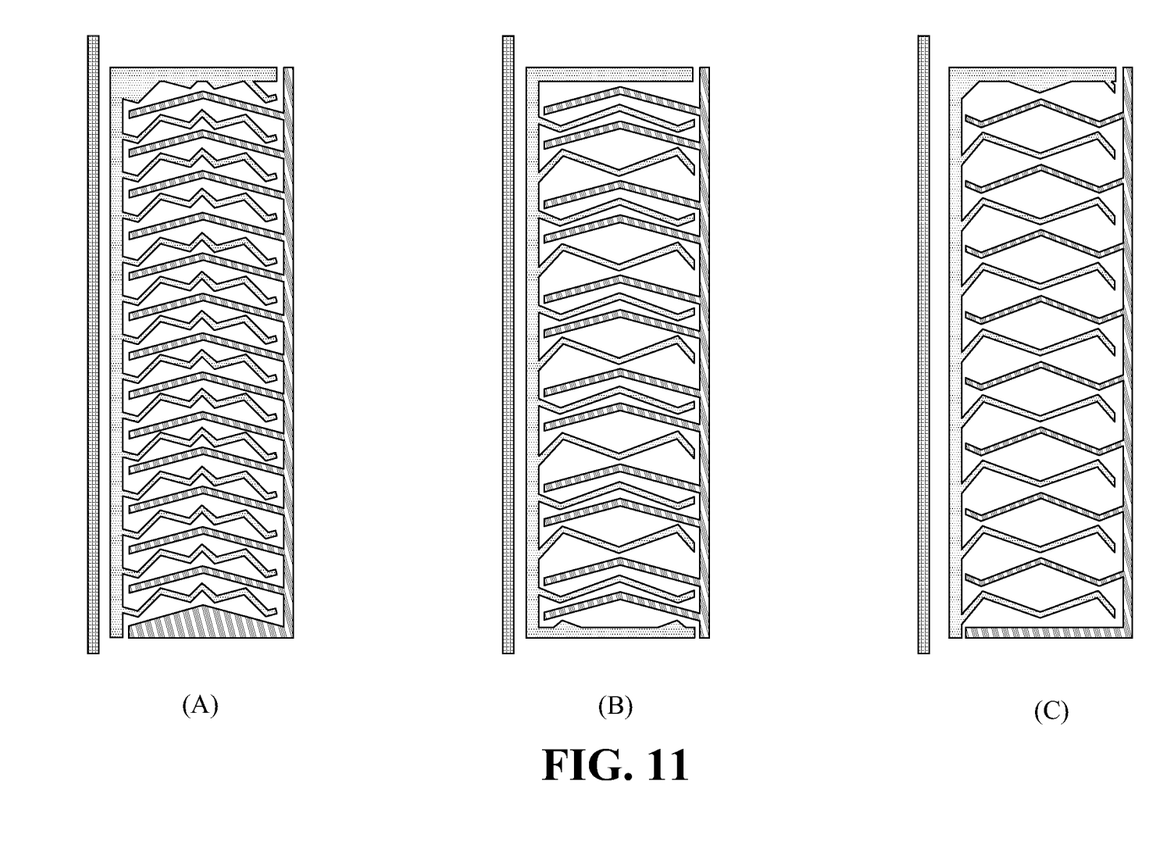
FIGS. 11A-11C show another three examples of the first and second electrodes, oriented substantially in a direction following a reversed V-shape, formed above the first substrate according to the present invention.

FIGS. 11A-11C show the top view of another three examples of the first and second electrodes formed in accordance with the present invention. The first and second electrodes in FIGS. 11A-11C are similar to those of FIGS. 3A-3C and 4A-4C except for the running direction. In FIGS. 3A-3C, the running direction of the two electrodes is in the vertical direction, and in FIGS. 4A-4C the running direction is at a 45° angle with respect to the vertical direction. In FIGS. 11A-11C, the running direction is oriented along a reversed V-shape direction.

In FIG. 11A, each of the first electrodes comprises an array of V-shaped electrode segments. Each of the second electrodes is a strip electrode. In FIG. 11B, each of the first electrodes comprises an array of V-shaped electrode segments and each of the second electrodes is also a strip electrode but every two adjacent first electrodes form a substantially mirrored pair with respect to the reversed V-shape direction. In FIG. 11C, each of the first and second electrodes comprises an array of V-shaped electrode segments and every two adjacent first and second electrodes form a substantially mirrored pair with respect to the reversed V-shape direction. In all three cases, both first and second electrodes are oriented substantially following the reversed V-shape direction.

The first and second electrodes shown in the examples of FIGS. 3A-3C are oriented substantially in parallel with the direction of the data line. The first and second electrodes shown in the examples of FIGS. 4A-4C are oriented substantially at a 45° angle with respect to the direction of the data line. The first and second electrodes shown in the examples of FIGS. 11A-11C are oriented substantially in the direction following a reversed V-shape. According to the present invention, the first and second electrodes can also be oriented at other angles with respect to the direction of the data line. For example, they can be oriented at angles such as 15°~30° or 90°.

As can be seen in the examples shown above, the principle of the present invention is that the spacing between the first and second electrodes formed on the first substrate of the lateral electric field type LCD device is made to be non-uniform. As shown in FIGS. 3-11, an important aspect of the present invention is that the uneven spacing between two adjacent first and second electrodes varies substantially periodically along the elongated direction of the two adjacent electrodes from a minimum spacing to a maximum spacing. Many variations can be made according to the principle of the present invention. The lateral electric field type LCD device manufactured according to the present invention has a lower critical voltage and provides better contrast for the displayed image.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A lateral electric field type liquid crystal display (LCD) device, comprising:
    a first substrate formed with at least one first electrode and at least one second electrode interleaved with said at least one first electrode, each of said at least one first electrode including at least one V-shape electrode segment in an elongated direction;
    a first alignment layer disposed above said at least one first electrode and said at least one second electrode;
    a second substrate;
    a second alignment layer disposed below said second substrate; and
    a liquid crystal (LC) layer disposed between said first alignment layer and said second alignment layer;
    wherein said at least one second electrode is a strip electrode running in said elongated direction, and adjacent first electrode and second electrode have a maximum spacing three times greater than a minimum spacing between said adjacent first electrode and second electrode along said elongated direction.

2. The lateral electric field type LCD device as claimed in claim 1, wherein said elongated direction and a data line of said lateral electric field type LCD device form a specific angle.

3. The lateral electric field type LCD device as claimed in claim 2, wherein said specific angle is 0°.

4. The lateral electric field type LCD device as claimed in claim 2, wherein said specific angle is 45°.

5. The lateral electric field type LCD device as claimed in claim 2, wherein said specific angle is between 15° and 30°.

6. The lateral electric field type LCD device as claimed in claim 2, wherein said specific angle is 90°.

7. A lateral electric field type liquid crystal display (LCD) device, comprising:
    a first substrate formed with a plurality of first electrodes and at least one second electrode interleaved with said plurality of first electrodes, each of said plurality of first electrodes including at least one V-shape electrode segment in an elongated direction and every two adjacent first electrodes forming a mirrored pair;
    a first alignment layer disposed above said plurality of first electrodes and said at least one second electrode;
    a second substrate;
    a second alignment layer disposed below said second substrate; and
    a liquid crystal (LC) layer disposed between said first alignment layer and said second alignment layer;
    wherein said at least one second electrode is a strip electrode running in said elongated direction, and every two adjacent first electrode and second electrode have a maximum spacing three times greater than a minimum spacing between said two adjacent first electrode and second electrode along said elongated direction.

8. The lateral electric field type LCD device as claimed in claim 7, wherein said elongated direction and a data line of said lateral electric field type LCD device form a specific angle.

9. The lateral electric field type LCD device as claimed in claim 8, wherein said specific angle is 0°.

10. The lateral electric field type LCD device as claimed in claim 8, wherein said specific angle is 45°.

11. The lateral electric field type LCD device as claimed in claim 8, wherein said specific angle is between 15° and 30°.

12. The lateral electric field type LCD device as claimed in claim 8, wherein said specific angle is 90°.

13. A lateral electric field type liquid crystal display (LCD) device, comprising:
    a first substrate formed with at least one first electrode and at least one second electrode interleaved with said at least one first electrode, each of said at least one first electrode including an array of electrode segments in an elongated direction;
    a first alignment layer disposed above at least one first electrode and said at least one second electrode;
    a second substrate;
    a second alignment layer disposed below said second substrate; and
    a liquid crystal (LC) layer disposed between said first alignment layer and said second alignment layer;
    wherein said at least one second electrode is a strip electrode running in said elongated direction, adjacent first electrode and second electrode have an uneven spacing between said adjacent first electrode and second electrode along said elongated direction, and said uneven spacing varies from a minimum spacing gradually to a maximum spacing three times greater than said minimum spacing for at least two cycles along said elongated direction.

14. The lateral electric field type LCD device as claimed in claim 13, wherein each electrode segment of said array of electrode segments has at least an extruded portion and at least an intruded portion.

15. The lateral electric field type LCD device as claimed in claim 13, wherein each electrode segment of said array of electrode segments has at least two V-shape electrodes.

16. The lateral electric field type LCD device as claimed in claim 13, wherein said elongated direction and a data line of said lateral electric field type LCD device form a specific angle.

17. The lateral electric field type LCD device as claimed in claim 16, wherein said specific angle is 0°.

18. The lateral electric field type LCD device as claimed in claim 16, wherein said specific angle is 45°.

19. The lateral electric field type LCD device as claimed in claim 16, wherein said specific angle is 90°.

20. The lateral electric field type LCD device as claimed in claim 16, wherein said specific angle is between 15° and 30°.

\* \* \* \* \*